US011953116B2

(12) United States Patent
Kaneko et al.

(10) Patent No.: US 11,953,116 B2
(45) Date of Patent: Apr. 9, 2024

(54) ELECTROMAGNETIC VALVE AND FLUID SYSTEM

(71) Applicant: HAMANAKODENSO CO., LTD., Kosai (JP)

(72) Inventors: Fumiaki Kaneko, Kosai (JP); Masashi Sugano, Kosai (JP); Yutaka Sato, Kosai (JP); Masahiro Hisada, Kosai (JP)

(73) Assignee: HAMANAKODENSO CO., LTD., Kosai (JP)

( * ) Notice: Subject to any disclaimer, the term of this patent is extended or adjusted under 35 U.S.C. 154(b) by 64 days.

(21) Appl. No.: 17/940,306

(22) Filed: Sep. 8, 2022

(65) Prior Publication Data
US 2023/0003312 A1   Jan. 5, 2023

Related U.S. Application Data

(63) Continuation of application No. PCT/JP2021/005013, filed on Feb. 10, 2021.

(30) Foreign Application Priority Data

Mar. 13, 2020   (JP) ................................ 2020-044325

(51) Int. Cl.
*F16K 31/06*   (2006.01)
*F16K 1/44*   (2006.01)
*F16K 17/04*   (2006.01)

(52) U.S. Cl.
CPC ............ *F16K 31/0675* (2013.01); *F16K 1/44* (2013.01); *F16K 17/048* (2013.01);
(Continued)

(58) Field of Classification Search
CPC .... F16K 31/0675; F16K 31/0606; F16K 1/44; F16K 17/048; F16K 31/0631; F16K 31/0627; Y10T 137/87877
See application file for complete search history.

(56) References Cited

U.S. PATENT DOCUMENTS 1,003,916 A * 9/1911 Koenig .............. G05D 16/0663
                                                        251/146
2,934,090 A * 4/1960 Kenann ................. F16K 11/044
                                                        137/625.5
(Continued)

FOREIGN PATENT DOCUMENTS

| JP | H05141565 A | 6/1993 |
| JP | 2006010228 A | 1/2006 |
| JP | 2014066309 A | 4/2014 |

OTHER PUBLICATIONS

U.S. Appl. No. 17/940,333, filed Sep. 8, 2022, Kaneko et al.

*Primary Examiner* — Matthew W Jellett
*Assistant Examiner* — Christopher D Ballman
(74) *Attorney, Agent, or Firm* — Harness, Dickey & Pierce, P.L.C.

(57) ABSTRACT

A valve body has an inflow passage for a working fluid, an outflow passage for the working fluid, and a pressure relief passage, which connects the inflow passage and the outflow passage by bypassing a normally close valve seat. A pressure relief valve is located in the pressure relief passage. The pressure relief valve closes the pressure relief passage, if a pressure of the working fluid in the outflow passage is lower than, is equal to, and is higher by a pressure difference less than a predetermined relief pressure than a pressure of the working fluid in the inflow passage. The pressure relief valve opens the pressure relief passage, if the pressure of the working fluid in the outflow passage is higher by a pressure difference equal to or higher than the relief pressure than a pressure of the working fluid in the inflow passage.

7 Claims, 12 Drawing Sheets

(52) U.S. Cl.
CPC ...... *F16K 31/0606* (2013.01); *F16K 31/0627* (2013.01); *F16K 31/0631* (2013.01); *Y10T 137/87877* (2015.04)

(56) References Cited

U.S. PATENT DOCUMENTS

| | | | | |
|---|---|---|---|---|
| 3,329,165 | A * | 7/1967 | Lang | F16K 27/029 |
| | | | | 137/625.5 |
| 4,017,126 | A * | 4/1977 | Ohta | B60T 8/4225 |
| | | | | 303/10 |
| 4,349,043 | A * | 9/1982 | Christensen | F16K 17/0406 |
| | | | | 166/319 |
| 4,442,998 | A * | 4/1984 | Ohyama | H01F 7/13 |
| | | | | 137/625.5 |
| 4,915,134 | A * | 4/1990 | Toliusis | F16K 11/044 |
| | | | | 137/625.65 |
| 5,265,582 | A * | 11/1993 | Bhogal | F41B 11/724 |
| | | | | 124/73 |
| 5,400,816 | A * | 3/1995 | Gerstenberger | F15B 13/01 |
| | | | | 137/599.08 |
| 5,412,948 | A * | 5/1995 | Komura | F16H 61/40 |
| | | | | 137/539.5 |
| 5,778,925 | A * | 7/1998 | Cooke | F02M 55/02 |
| | | | | 137/493.9 |
| 5,950,669 | A * | 9/1999 | Fehlmann | F02M 59/462 |
| | | | | 123/506 |
| 6,612,338 | B2 * | 9/2003 | Weldon | F16K 3/265 |
| | | | | 137/589 |
| 6,772,791 | B2 * | 8/2004 | Neff | F16K 31/0634 |
| | | | | 137/906 |
| 6,837,219 | B2 * | 1/2005 | York | F02M 69/54 |
| | | | | 123/511 |
| 7,028,708 | B1 * | 4/2006 | Langenfeld | F16K 17/18 |
| | | | | 137/513.5 |
| 7,036,522 | B2 * | 5/2006 | Williams | F16K 31/0627 |
| | | | | 137/356 |
| 7,267,108 | B2 * | 9/2007 | Barylski | F02M 37/0082 |
| | | | | 123/457 |
| 7,451,780 | B1 * | 11/2008 | Trimble | F16K 17/0486 |
| | | | | 137/493.5 |
| 8,347,846 | B2 * | 1/2013 | Kobayashi | F01P 7/162 |
| | | | | 123/196 R |
| 8,783,284 | B2 * | 7/2014 | Kato | H01M 8/04089 |
| | | | | 137/487 |
| 9,169,815 | B2 * | 10/2015 | Akita | F02M 37/0058 |
| 11,655,909 | B2 * | 5/2023 | Mellings | F16K 31/003 |
| | | | | 137/625.44 |
| 2007/0164243 | A1* | 7/2007 | Volz | F16K 31/0603 |
| | | | | 251/30.03 |
| 2014/0084194 | A1 | 3/2014 | Kibune | |

* cited by examiner

ELECTROMAGNETIC VALVE AND FLUID SYSTEM

CROSS REFERENCE TO RELATED APPLICATIONS

The present application is a continuation application of International Patent Application No. PCT/JP2021/005013 filed on Feb. 10, 2021, which designated the U.S. and is based on and claims the benefit of priority from Japanese Patent Application No. 2020-44325 filed on Mar. 13, 2020, the entire disclosure of the above application is incorporated herein by reference.

TECHNICAL FIELD

This disclosure relates to an electromagnetic valve, which opens and closes a flow path of a working fluid, and a fluid system.

BACKGROUND

An electromagnetic valve may open or close a flow path of a working fluid. The electromagnetic valve may be applied for switching the flow path of the working fluid. In this case, it is required to prevent leakage of the working fluid.

SUMMARY

For example, a pressure of the working fluid may fluctuate at a downstream of the electromagnetic valve. In this case, it is desirable to prevent leakage of the working fluid. Further improvements are required for electromagnetic valves and fluid systems including electromagnetic valves in the above-mentioned aspects or in other aspects not mentioned.

A first disclosure comprises: a coil which is magnetized if energized; a core which is arranged in a magnetic circuit of the coil; a plunger which is arranged in the magnetic circuit of the coil opposed to the core via a magnetic gap; a valve member which is movable with the plunger; and a normally close compression spring which urges the valve member toward a side to a normally close valve seat. Since the electromagnetic valve moves the valve member by using a coil magnetization force generated by energizing the coil, the normally close valve seat is closed by the valve member during it is not energized.

Further, it comprises a valve body which includes: an inflow passage of the working fluid; an outflow passage of the working fluid; a normally close valve seat which is formed between the inflow passage and the outflow passage and is come into contact with the valve member; and a pressure relief passage communicating the inflow passage and the outflow passage by bypassing the normally close valve seat. According to the first disclosure, even if the normally close valve seat is closed, it is possible to communicate the inflow passage and the outflow passage by the pressure relief passage.

In the first disclosure, a pressure relief valve is arranged in a portion of the pressure relief passage in the valve body. The pressure relief valve closes the pressure relief passage, if a pressure of the working fluid in the outflow passage is lower than, is equal to, and is higher by a pressure difference less than a predetermined relief pressure than a pressure of the working fluid in the inflow passage. The pressure relief valve opens the pressure relief passage, if the pressure of the working fluid in the outflow passage is higher by a pressure difference equal to or higher than the relief pressure than a pressure of the working fluid in the inflow passage.

According to the first disclosure, by opening the pressure relief valve, it is possible to prevent the pressure of the working fluid in the outflow passage from becoming higher than the predetermined relief pressure.

A second disclosure includes two outflow passages, a normally close outflow passage and a normally open outflow passage. A normally close valve seat and a normally open valve seat are formed on the valve body.

In the second disclosure, the working fluid from the inflow passage flows to the normally close outflow passage when the coil is energized, and the working fluid flows to the normally open outflow passage when the coil is not energized. This makes it possible to switch the flow of the working fluid depending on whether the coil is energized or de-energized.

In a third disclosure, a passage cross-sectional area of the pressure relief passage is smaller than passage cross-sectional areas of the inflow passage and the outflow passage. The pressure relief passage may be sufficient as long as it can release the pressure, and it is not necessary to enable a large flow amount of the working fluid. By reducing the cross-sectional area of the passage, the valve body can be miniaturized.

A fourth disclosure relates to a structure of the pressure relief valve. The pressure release valve includes: a pressure relief valve seat formed in the pressure relief passage; the pressure relief valve member arranged in a side to the inflow passage of the pressure relief valve seat; and a pressure relief spring urges the pressure relief valve member toward a side to the pressure release valve seat. An pressure relief operation is available by a simple structure by urging the pressure relief valve member against the pressure relief valve seat.

A fifth disclosure also relates to a structure of the pressure relief valve. The pressure relief passage is in a circular and tubular shape, the pressure relief valve member is a columnar shape which slides in the pressure relief passage in the circular and tubular shape, and the pressure relief valve member has a pressure relief groove formed on a peripheral surface of the columnar shape.

Since the pressure relief valve member is guided by the pressure relief passage, the pressure relief valve member can be smoothly moved. In the state that the pressure relief valve member is separated from the pressure relief valve seat, the pressure of the working fluid can be released by the pressure relief groove.

A sixth disclosure also relates to a structure of the pressure relief valve. A duck bill valve having a slit at a tip end is used as the pressure relief valve. A pressure relief valve can be configured with a simpler structure.

Seventh disclosure is a fluid system that includes the electromagnetic valve. The fluid system comprises: a tank for the working fluid; a pump which sucks the working fluid from the tank and discharges the working fluid in a high pressure; a pipe through which the working fluid from the pump flows; a stop valve which is arranged in the pipe, opens the pipe if the pressure of the working fluid in the pipe is equal to or higher than an open pressure and closes the pipe if the pressure of the working fluid in the pipe is less than the open pressure; and the electromagnetic valve described above. The electromagnetic valve is located between the pump and the stop valve.

A relief pressure of the pressure relief valve of the electromagnetic valve is set to be smaller than an open pressure of the stop valve. In this fluid system, a pressure of the working fluid in the pipe is always kept less than the open pressure. As a result, it is possible to prevent an unintended leakage of the working fluid.

DETAILED DESCRIPTION

JP2014-66309A discloses a comparative example. JP2014-66309A discloses a configuration in which a flow path of a washer fluid is switched by using an electromagnetic valve. In this technology, the washer fluid flows to a wind glass when the electromagnetic valve is not energized and flows to a rear camera when the electromagnetic valve is energized.

It is an object of this disclosure to prevent an unintended outflow of the working fluid even if the pressure of the working fluid rises in a normally close pipe.

First Embodiment

Figure 1:
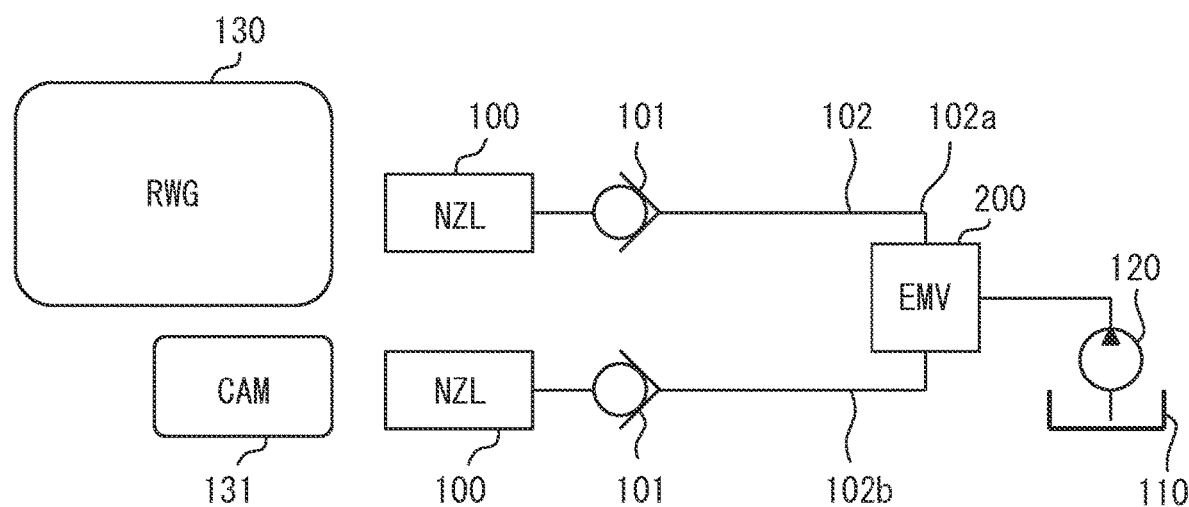
FIG. 1 is a diagram illustrating a piping configuration of an electromagnetic valve.

The first embodiment is a fluid system illustrated in FIG. 1. The fluid system controls a behavior of the working fluid in the pipe 102. The fluid system provides a control device which controls the behavior of the working fluid, including the pressure. FIG. 1 shows a fluid system in a vehicle washer system. The fluid system illustrated in FIG. 1 uses a three-way valve which switches flow paths as the electromagnetic valve 200 (EMV). In FIG. 1, the washer fluid in the tank 110 is pressurized by the pump 120 and supplied to the electromagnetic valve 200.

A stop valve 101, which opens at a constant pressure, is arranged in front of a nozzle 100 (NZL), which injects the washer fluid. The stop valve 101 is arranged in a pipe 102 between the electromagnetic valve 200 and a nozzle 100. The stop valve 101 opens the pipe when the pressure of the working fluid in the pipe 102 is equal to or higher than the open pressure. The stop valve 101 closes the pipe when the pressure of the working fluid in the pipe 102 is less than the open pressure. The stop valve 101 has a setting member such as a spring for setting the open pressure. The washer fluid is trapped in the pipe 102 by the stop valve 101, and it is possible to improve a responsiveness at a next operation.

The electromagnetic valve disclosed in JP2014-66309A may be used as the electromagnetic valve 200 illustrated in FIG. 1. The washer fluid in the pipe (hereinafter referred to as the normally close pipe 102a), which is closed in a state where the electromagnetic valve 200 is not energized, is held between the electromagnetic valve 200 and the stop valve 101.

Therefore, if a temperature of the pipe 102 rises, the air and the washer fluid in the normally close pipe 102a expand, and an internal pressure rises. In the electromagnetic valve of JP2014-66309A, since the normally close pipe is connected to the rear camera, when an increase of an internal pressure becomes higher than a set open pressure of the stop valve 101, the stop valve 101 opens and the washer fluid spills out on the rear camera.

On the other hand, the nozzle 100 of the normally close pipe 102a shown in FIG. 1 faces the rear window glass 130 (RWG), and the washer fluid is injected to the rear window glass 130. The nozzle of the normally open pipe 102b injects the washer fluid to the camera 131 (CAM). Unlike JP2014-66309A, in this disclosure, the washer fluid from the pump 120 is sprayed onto the camera 131 when the electromagnetic valve 200 is not energized. This is because the camera 131 is used more frequently than the rear window glass 130.

Figure 2:
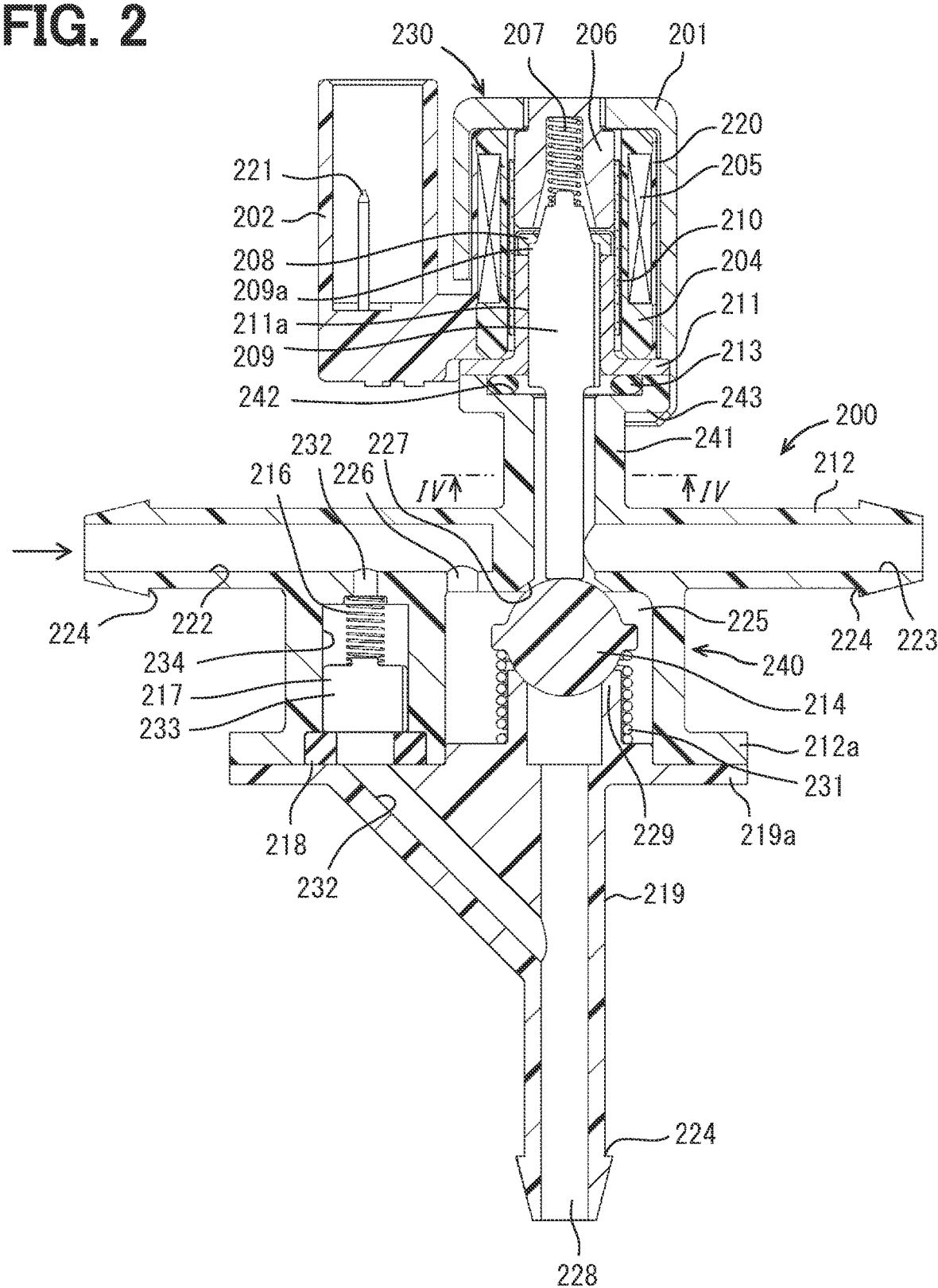
FIG. 2 is a cross-sectional view of the electromagnetic valve of a first embodiment.
Figure 3:
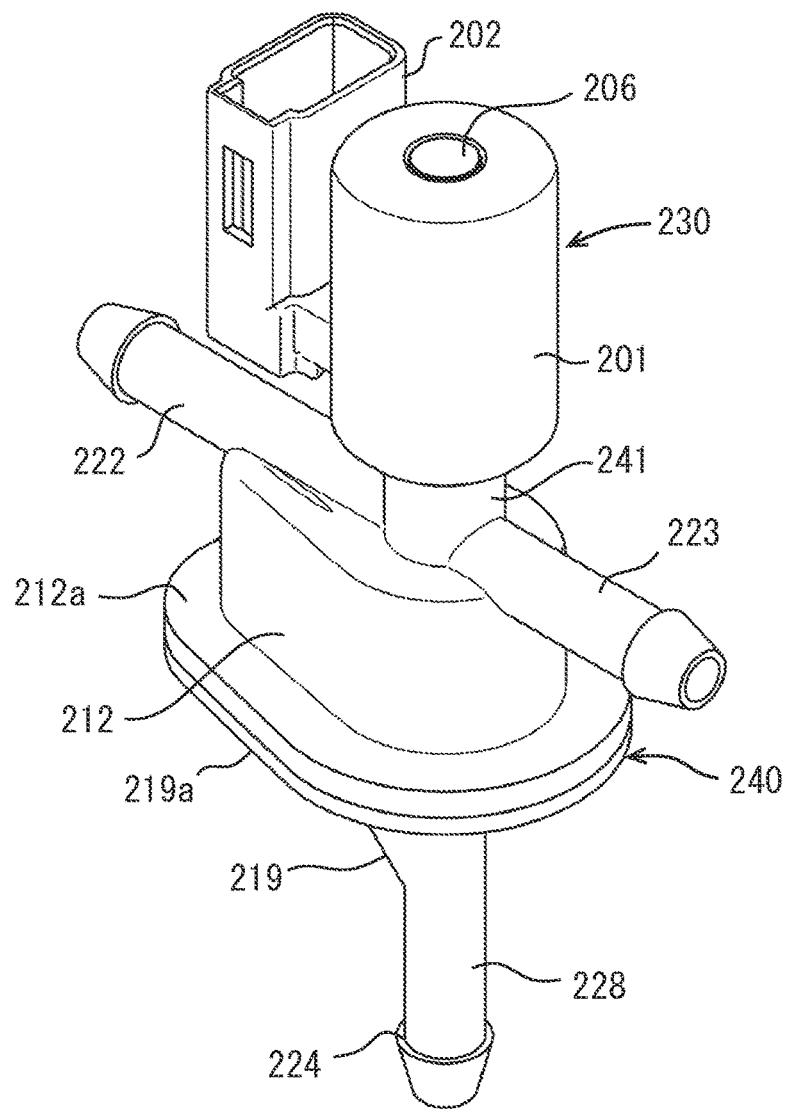
FIG. 3 is a perspective view of the electromagnetic valve illustrated in FIG. 2.
Figure 4:
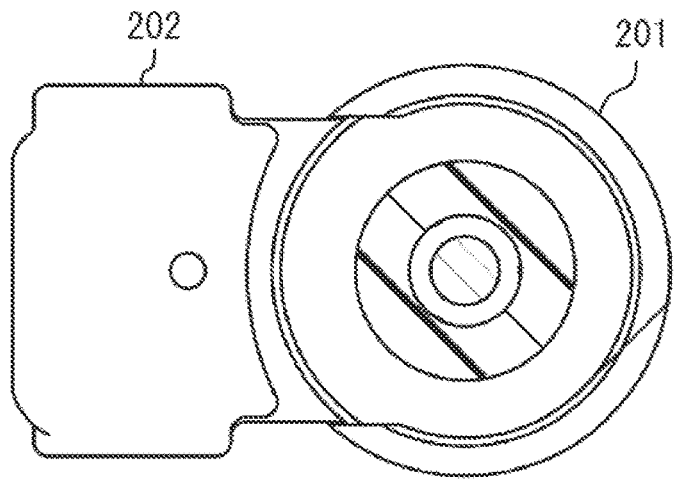
FIG. 4 is a cross-sectional view taken along a line IV-IV in FIG. 2.

As shown in FIGS. 2, 3, and 4, the electromagnetic valve 200 has a coil 205 made of a copper wire wound around a resin coil bobbin 204 in a large number of times. A stator 211 is arranged on the inner circumference of the coil bobbin 204 via a sleeve 210. The sleeve 210 is a non-magnetic material, for example, SUS304 is used. On the other hand, the stator 211 is a magnetic material, for example, SUS430 is used.

Further, the outer circumference of the coil bobbin 204 is covered with a resin outer shell 220. The outer shell 220 is integrally formed with a connector 202. A pair of terminals 221 are embedded in the connector 202, and the pair of terminals 221 are connected to the plus side and the minus side of the coil 205, respectively.

A core 206 made of a magnetic material is arranged in an inside of the coil bobbin 204. The core 206 has a cylindrical shape with a closed upper end. An open end of the core 206 has a concave tapered shape.

The plunger 209 is arranged so as to face the tapered shape portion of the core 206. The plunger 209 has a columnar shape. An upper end of the plunger 209 has a convex tapered shape corresponding to the tapered shape of the core 206. The plunger 209 has a shoulder portion 209a continuous to an upper end of the tapered shape, and the washer 208 is engaged with the shoulder portion 209a. The washer 208 is a non-magnetic material such as SUS304. The washer 208 prevents the magnetic core 206 and the plunger 209 from remaining attracted by a residual magnetic force after an end of energization. The plunger 209 is guided by the cylindrical portion 211a of the stator 211. The plunger 209 can be moved in the vertical direction shown in FIG. 2.

A normally close compression spring 207 which urges the plunger 209 in the direction of pulling it away from the core 206 is arranged in the core 206. A yoke 201 is arranged on an outer periphery of the outer shell 220 of the coil bobbin 204. The yoke 201 is made of magnetic steel. When the coil 205 is energized, a magnetic circuit is formed by the yoke 201, the core 206, the plunger 209, and the stator 211.

With the above configuration, the electromagnetic section 230 is configured. The electromagnetic section 230 is coupled to a flow path section 240 via an O-ring 213. The flow path section 240 provides a valve body. The valve body is divided into an upper body 212 and a lower body 219.

The upper body 212 is formed with an inflow passage 222 into which the high-pressure washer fluid from the pump 120 flows in, and a normally open outflow passage 223 connected to the normally open pipe 102b toward the camera 131. An outer periphery of an end portion of the inflow passage 222 and the normally open outflow passage 223 is tapered so that the pipe 102 can be easily connected. A shoulder portion 224 is formed at an end of the tapered shape to prevent the pipe 102 from being disassembled.

A valve chamber 225 is formed in the upper body 212. The valve chamber 225 communicates with the inflow passage 222 via a communication hole 226. The valve chamber 225 communicates with the normally open outflow passage 223 via the normally open valve seat 227.

A connection portion 241 with the electromagnetic section 230 is formed on an upper portion of the upper body 212. The connecting portion 241 has a circular and tubular shape, and a plunger 209 is arranged inside thereof. Further, an upper part of the connection portion 241 is widened. The connecting portion 241 provides a surface 242 receiving the O-ring 213 and also provides a shoulder portion 243 engaging with the yoke 201.

The lower body 219 is formed with a normally close outflow passage 228 connected to a normally close pipe 102a leading to the rear window glass 130. An end portion has a tapered shape and a shoulder portion 224 is formed, which is the same as the above-mentioned inflow passage 222 and the normally open outflow passage 223. The normally close outflow passage 228, the inflow passage 222, and the normally open outflow passage 223 commonly have an inner diameter of about 3 mm.

The lower body 219 is formed with a cylindrical normally close valve seat 229 protruding into the valve chamber 225. The valve member 214 is arranged in the valve chamber 225 between the normally open valve seat 227 and the normally close valve seat 229. The valve member 214 is a movable valve member being electromagnetically operated. The valve member 214 has a three-dimensional shape which occupies a predetermined volume. The valve member 214 has two sealing surfaces that can be selectively seated on the normally open valve seat 227 and the normally close valve seat 229. The valve member 214 is a double-sided valve member having sealing surfaces at both ends in the axial direction. The valve member 214 is a spherical shape. The normally open valve seat 227 and the normally close valve seat 229 have a concave tapered shape, and commonly have an inner diameter of less than 5 mm.

Figure 5:
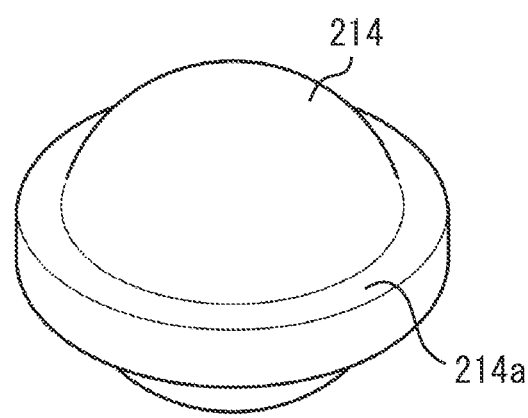
FIG. 5 is a perspective view of a valve member illustrated in FIG. 2.
Figure 6:
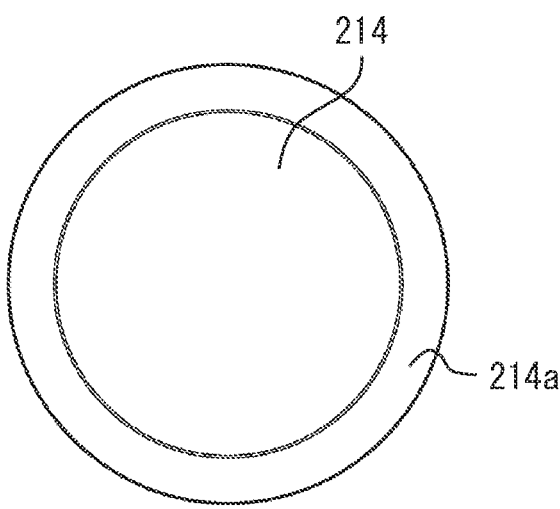
FIG. 6 is a top view of the valve member illustrated in FIG. 2.

As shown in FIGS. 5 and 6, the valve member 214 is a spherical shape with a diameter of a little over 7 mm. The valve member 214 has a spring receiver 214a in an annular shape at an equator portion. The spring receiver 214a protrudes a little less than 1 mm from a spherical surface of the valve member 214. The valve member 214 is integrally molded with the spring receiver 214a by a water resistant rubber, and has a coating on the surface. This rubber material is the same as the O-ring 213. The coating material is a substance such as fluorine or molybdenum that prevents the surface of rubber from melting and improves the seating property of the valve member and the valve seat combined.

A normally open compression spring 231 is arranged on the outer periphery of the cylindrical normally close valve seat 229. An inner diameter of the normally open compression spring 231 is slightly larger than an outer diameter of the normally close valve seat 229. The normally open compression spring 231 is held by the normally close valve seat 229. The normally open compression spring 231 engages with the spring receiver 214a of the valve member 214 to urge the valve member 214 toward a side to the normally open valve seat 227.

As a result, both an urging force of the normally close compression spring 207 and an urging force of the normally open compression spring 231 received via the plunger 209 are applied to the valve member 214. Here, the urging force of the normally close compression spring 207 is sufficiently larger than the urging force of the normally open compression spring 231. As a result, when the coil 205 is not energized, the valve member 214 is urged against the normally close valve seat 229 and closes the normally close outflow passage 228.

The lower body 219 is formed with a pressure relief passage 232 which bypasses the normally close valve seat 229 and connects the inflow passage 222 and the normally close outflow passage 228. Further, the pressure relief passage 232 is also formed in the upper body 212. An inner diameter of the pressure relief passage 232 is about 2 mm. The pressure relief passage 232 is a circular passage having a circular internal cross section. The pressure relief passage 232 is also in a circular and tubular shape.

A pressure relief valve 233 for opening and closing the pressure relief passage 232 is arranged in the upper body 212. The pressure relief valve 233 includes a pressure relief valve seat 218, a pressure relief valve member 217, and a pressure relief spring 216. The pressure relief valve seat 218 is made of a rubber material having a fluorine coating on a surface similar to the valve member 214. The pressure relief valve seat 218 is held by being sandwiched between the upper body 212 and the lower body 219.

The pressure relief valve member 217 is made of resin. The pressure relief valve member 217 has a columnar shape. The pressure relief valve member 217 is movably arranged along a pressure relief guide 234 formed on the upper body 212. Both an outer diameter of the pressure relief valve member 217 and an inner diameter of the pressure relief guide 234 are about diameters little over 5 mm. The pressure relief valve member 217 is a pressure responsive type movable valve member which is displaced in response to a pressure difference.

Figure 7:
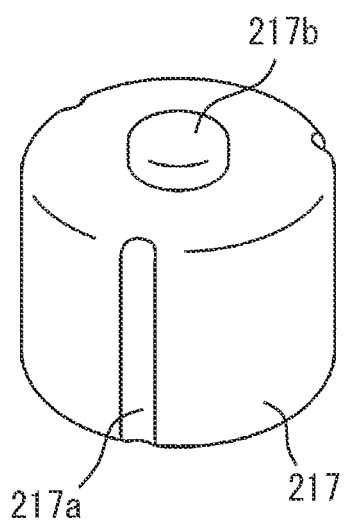
FIG. 7 is a perspective view of a pressure relief valve member illustrated in FIG. 2.
Figure 8:
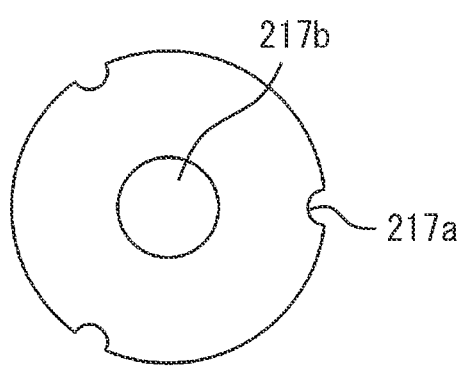
FIG. 8 is a top view of the pressure relief valve member illustrated in FIG. 2.

As shown in FIGS. 7 and 8, three pressure relief grooves 217a are formed on an outer periphery of the pressure relief valve member 217. The pressure relief groove 217a is a semicircle with a radius of about 0.3 mm. On an upper surface of the pressure relief valve member 217, a pressure relief spring receiver 217b for receiving the pressure relief spring 216 is formed in a protruding manner in a columnar shape. The pressure relief valve member 217 is a columnar valve member which slides in a circular pressure relief passage 232. A pressure relief groove 217a is formed on an outer peripheral surface of the cylindrical pressure relief valve member 217.

Therefore, the pressure relief spring 216 is held by being sandwiched between the pressure relief spring receiver 217b and the spring receiver formed at a lower end of the pressure relief passage 232 of the upper body 212. The pressure relief spring 216 urges the pressure relief valve member 217 toward a side to the pressure relief valve seat 218. A set pressure (relief pressure) of the pressure relief spring 216 is about 5 Kilopascals. The pressure relief spring 216 provides a setting member for setting the relief pressure. The relief pressure is about half of the set pressure (open pressure) of the stop valve 101. Therefore, the relief pressure is smaller than the open pressure.

Next, a method of assembling the electromagnetic valve 200 having the above structure is described. First, a method of assembling the electromagnetic section 230 is described. The method for assembling the electromagnetic valve 200 includes (i) an assembly step of the electromagnetic section 230, (ii) an assembly step of the flow path section 240, and (iii) a connection step of connecting the electromagnetic section 230 and the flow path section 240. These steps may be performed in the order of (i), (iii), (ii).

In the assembly process of the electromagnetic section 230, the coil 205 is wound many times around the outer circumference of the coil bobbin 204, a pair of terminals 221 are connected to both ends of the coil 205, and in that state, the outer shell 220 and the connector 202 are formed by a resin molding method. As the resin, for example, Polyphenylene Sulfide (PPS) is used. Next, the core 206 and the stator 211 are arranged in the inner circumference of the coil bobbin 204 via the sleeve 210. After that, the yoke 201 is arranged on the outer circumference of the outer shell 220. In this way, the electromagnetic section 230 is assembled.

In the connecting step, the O-ring 213 is arranged on the upper surface 242 of the upper body 212. Next, a lower end of the yoke 201 is placed over the shoulder portion 243 of the upper body 212. Next, a lower edge of the yoke 201 is caulked so as to wrap the shoulder portion 243 of the upper body 212. FIG. 4 shows a state after caulking. The caulking process is performed over an arc range of 180 degrees or more excluding a portion where the connector 202 is located, among the edge of the yoke 201. As a result, an edge of the yoke 201 wraps around the shoulder portion 243.

By caulking the yoke 201, the upper end of the upper body 212 comes into contact with the lower end of the stator 211. By caulking, the O-ring 213 is compressed and deformed by being sandwiched between the lower end of the stator 211 and the upper surface 242 of the upper body 212.

The method of assembling the electromagnetic valve 200 includes an assembly step of the flow path section 240. An assembly step of the flow path section 240 includes a step of assembling the pressure relief valve 233 and a step of assembling an electromagnetically operated valve structure. These two steps are performed by assembling operations in the same direction. In the first step, the pressure relief spring 216 and the pressure relief valve member 217 are arranged on the pressure relief guide 234 of the upper body 212. After that, the pressure relief valve seat 218 is arranged in an opening of the pressure relief guide 234. In the second step, the valve member 214 is arranged on the normally open valve seat 227, and the normally open compression spring 231 is arranged so as to abut on the spring receiver 214a. The steps common to the first step and the second step combine the upper body 212 and the lower body 219. At this time, the pressure relief spring 216 and the normally open compression spring 231 are placed in a predetermined compression state.

A flange 212a of the upper body 212 and a flange 219a of the lower body 219 are in contact with each other. The assembly step includes a welding step of welding between the flange 212a and the flange 219a.

According to this disclosure, the flow path section 240 is assembled after the electromagnetic section 230 is assembled. Therefore, the flow path section 240 can be selected from a plurality of types of flow path sections. As a result, it is possible to use the electromagnetic section 230 commonly configured for a plurality of types of electromagnetic valves having different flow path sections 240. For example, it is possible to select a shape of parts below the upper body 212, it is possible to make the electromagnetic section 230 as a common part. As is described in a second and subsequent embodiments, the flow path section 240 may change directions of the inflow passage 222, the normally open outflow passage 223, and the normally close outflow passage 228. Furthermore, the normally open outflow passage 223 may be eliminated and replaced with a two-way valve. Even if the type of the flow path section 240 is changed in this way, the same electromagnetic section 230 can be commonly used.

Next, the operation of the fluid system and the electromagnetic valve 200 in this disclosure is described. The fluid system may include an electric control circuit that electrically controls the electromagnetic valve 200 and the pump 120 in response to a user's operation.

In the case that the washer fluid is injected from the nozzle 100 toward the camera 131, the electromagnetic valve 200 is not energized. Therefore, the valve member 214 receives the urging force of the normally close compression spring 207 via the plunger 209 and closes the normally close valve seat 229.

As an operation of the pump 120 is started, the high-pressure washer fluid is sent to the electromagnetic valve 200 via the pipe 102. Pumped washer fluid flows into the inflow passage 222, and then flows out from the normally open outflow passage 223 via the communication hole 226, the valve chamber 225, and the normally open valve seat 227.

The washer fluid of the electromagnetic valve 200 is injected from the nozzle 100 via the normally open pipe 102b. Since the pressure of the washer fluid rises to about 400 Kilopascals, the open pressure of the stop valve 101 (about 10 kilopascals) is hardly a problem.

If the cleaning of the camera 131 is completed, the operation of the pump 120 is stopped. Since the pressure in the pipe 102 becomes atmospheric pressure when the pump is stopped, the pipe 102 is closed by the stop valve 101. By closing the stop valve 101, it is possible to improve a sharp liquid shut off property in response to an end of injection. In addition, the stop valve 101 can block a backflow of air and store the washer fluid in the pipe 102. As a result, the washer fluid is rapidly injected at the next operation. In other words, it is possible to improve a responsiveness of an injection device for the washer fluid.

In the case that the washer fluid is injected onto the rear window glass 130, the electromagnetic valve 200 is energized. The coil 205 is excited by energization to form a magnetic circuit that passes through the yoke 201, the core 206, the plunger 209, and the stator 211. The plunger 209 moves to a side to the core 206 against the compressive force of the normally close compression spring 207, the magnetic gap between the tapered portion of the core 206 and the tapered portion of the plunger 209 is narrowed by the magnetic force.

As the plunger 209 moves, the valve member 214 is urged up by the normally open compression spring 231 to close the normally open valve seat 227. The operation of the electromagnetic valve 200 described above is performed before the start of operation of the pump 120. Therefore, a pressure of the high-pressure washer fluid from the pump 120 is not applied to the valve member 214, and the movement of the valve member 214 is not hindered.

The valve member 214 is a spherical shape, and the normally open valve seat 227 also has a concave tapered shape corresponding to the valve member 214. In other words, the surfaces of the valve member 214 and the normally open valve seat 227 are surfaces of a rotating body which may demonstrate self-alignment functions with each other. Therefore, even if the central axis of the valve member 214 is slightly displaced due to the extension of the normally open compression spring 231, the normally open valve seat 227 can be reliably sealed. In particular, since the valve member 214 is made of rubber, it can be brought into close contact with the normally open valve seat 227 by its own elasticity, and the sealing property can be further improved.

After energizing the electromagnetic valve 200 to switch the flow paths, the operation of the pump 120 is started. The high-pressure washer fluid from the pump 120 flows into the inflow passage 222, and then flows out from the normally close outflow passage 228 via the communication hole 226, the valve chamber 225, and the normally close valve seat 229. An outflowing washer fluid flows through the normally close pipe 102a and the stop valve 101, and is injected from the nozzle 100 to the rear window glass 130.

If the cleaning of the rear window glass 130 is completed, the operation of the pump 120 is stopped. If the pressure in the normally close pipe 102a drops below the open pressure of the stop valve 101, the stop valve 101 also closes. Subsequently, the energization of the electromagnetic valve 200 is also terminated. Since the washer 208 made of a non-magnetic material is interposed between the core 206 and the plunger 209, the plunger 209 is urged down by the normally close compression spring 207 in response to a finish of energization.

Since an urging force of the normally close compression spring 207 is larger than an urging force of the normally open compression spring 231, the valve member 214 is urged against the normally close valve seat 229. Since the normally close valve seat 229 also has a tapered shape corresponding to the spherical shape of the valve member 214, it can be reliably sealed like the above-mentioned normally open valve seat 227.

According to this embodiment, the valve member 214 has a three-dimensional shape which is convex on both sides. Further, the valve member 214 is arranged so as to fit within the tapered shape of the normally open valve seat 227 and the normally close valve seat 229. Therefore, it is not necessary to provide a guide for the valve member 214, and an assembly work of the valve member 214 becomes easy. That is, even if an axis of the valve member 214 is slightly displaced due to an influence of the normally open compression spring 231 and a flow of the washer fluid, the displacement of the valve member 214 is within a range of the normally open valve seat 227 and the normally close valve seat 229. Therefore, the valve member 214 is urged against the normally open valve seat 227 or the normally close valve seat 229 by the normally close compression spring 207 and a pressure of the washer fluid. Since both the normally open valve seat 227 and the normally closed valve seat 229 have a tapered shape, the valve member 214 is guided by the tapered shape. As a result, the valve member 214 comes into contact with the normally open valve seat 227 or the normally close valve seat 229 on the entire circumference thereof.

When the ambient temperature rises while the operation of the pump 120 is completed, the washer fluid and air in the pipe 102 expand. The normally open pipe 102b is closed by the stop valve 101, but since the normally open valve seat 227 is open, the pressure due to expansion is released to a side to the pump 120 and does not become excessively high. However, in the normally close pipe 102a, both the normally close valve seat 229 and the stop valve 101 are closed. Therefore, the washer fluid is trapped in the normally close pipe 102a. Therefore, the pressure in the normally close pipe 102a may rise excessively due to an expansion of the washer fluid and the air.

If the pressure rises equal to or higher than the open pressure of the stop valve 101, the washer fluid in the normally close pipe 102a may leak from the nozzle 100 to the rear window glass 130. However, according to this embodiment, the pressure relief valve 233 is opened to release the pressure, so that the leakage of the washer fluid can be reliably prevented.

If the pressure in the normally close pipe 102a becomes higher than the relief pressure, it lifts the pressure relief valve member 217 by overcoming an urging force of the pressure relief spring 216. As a result, the pressure relief valve seat 218 is opened and the pressure relief passage 232 is opened. The normally close outflow passage 228 communicates with the inflow passage 222 via the pressure relief groove 217a of the pressure relief valve member 217 and the pressure relief guide 234.

The relief pressure of the pressure relief valve 233 is about half of the open pressure of the stop valve 101. Therefore, by opening the pressure relief valve 233 before the stop valve 101 opens, it is possible to suppress an increase in pressure in the normally close pipe 102a.

Here, since the pressure relief passage 232 releases the pressure of a trapped part of the washer fluid, a large amount of the washer fluid does not flow in the pressure relief passage 232. A passage cross-sectional area of the pressure relief passage 232 is smaller than passage cross-sectional areas of the inflow passage 222 and the outflow passage 223 and 228. Therefore, even if there is a portion having a small flow path cross-sectional area (passage cross-sectional area) such as the pressure relief groove 217a, no malfunction occurs in an operation. In FIGS. 7 and 8, three pressure relief grooves 217a arranged in a symmetrical shape around an axis are formed in order to make them being balanced. If a required flow path cross-sectional area can be provided, the number of pressure relief grooves 217a may be one.

Further, since the pressure relief valve member 217 is held by the guide 234, even if the set pressure of the pressure relief spring 216 is small, a seal between the pressure relief valve member 217 and the pressure relief valve seat 218 is ensured.

Second Embodiment

Figure 9:
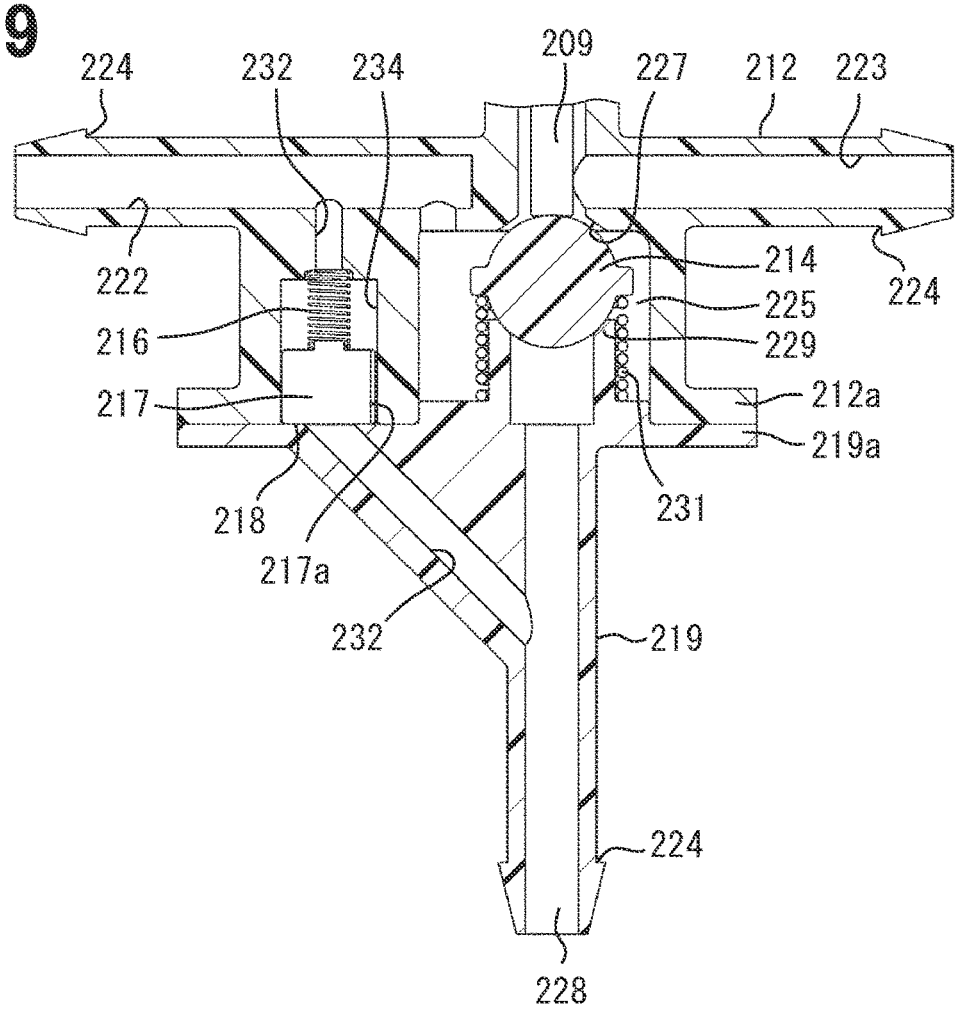
FIG. 9 is a cross-sectional view of an electromagnetic valve of a second embodiment.

In the second embodiment, as shown in FIG. 9, the pressure relief valve seat 218 is formed on an upper surface of the lower body 219. The pressure relief valve seat 218 is provided by a valve body rather than a special member. Since the lower body 219 is made of a resin such as Polyphenylene sulfide, the pressure relief valve member 217 is made of a rubber material to ensure sealing performance. That is, the pressure relief valve member 217 of the second embodiment is made of a rubber material which has a surface processed with a coating similar to the pressure relief valve seat 218 of the first embodiment.

Third Embodiment

Figure 10:
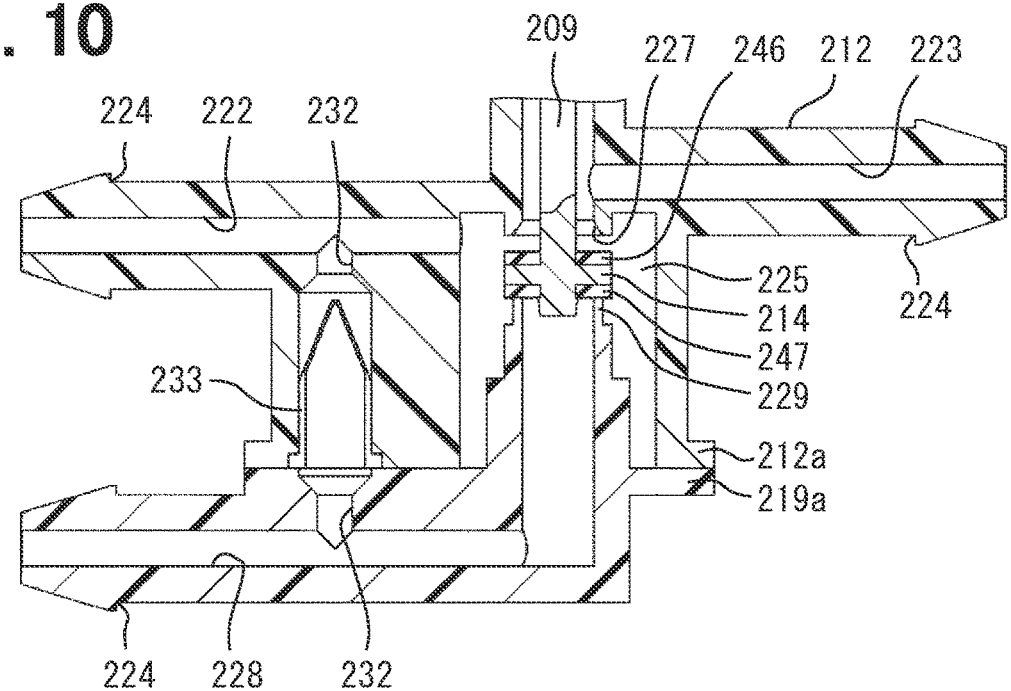
FIG. 10 is a cross-sectional view of the electromagnetic valve of a third embodiment.
Figure 11:
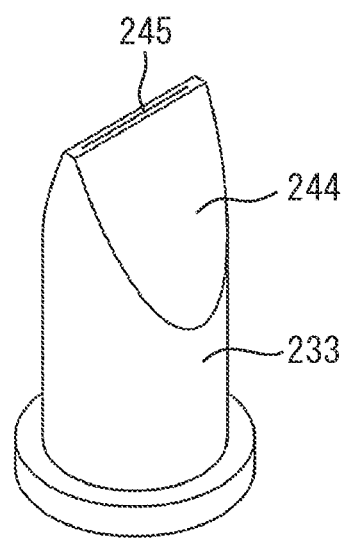
FIG. 11 is a perspective view of a duck-bill valve illustrated in FIG. 10.

In the third embodiment, as shown in FIG. 10, a duck bill valve is used as the pressure relief valve 233. As shown in FIG. 11, the duck bill valve has a tapered portion 244 at an upper end portion of a cylindrical body. The duck bill valve has a tapered cylindrical shape. The duck bill valve has a slit 245 at a tip end. The slit 245 can be opened and closed by deforming the cylindrical shape. The duck bill valve is made of rubber material.

If the pressure in the inflow passage 222 is higher than the pressure in the normally close outflow passage 228, the tapered portion 244 receives the pressure and the slit 245 closes. Contrary, if the pressure of the normally close outflow passage 228 becomes high, the pressure can be prevented from increasing by opening the slit 245 and letting the washer fluid release to a side to the inflow passage 222.

Further, in the third embodiment, the normally close outflow passage 228 is formed in parallel with the inflow passage 222 and the normally open outflow passage 223. It is possible to improve a degree of freedom in a handling of the piping 102.

Further, in the third embodiment, the valve member 214 is formed into a disk shape and integrally formed with the plunger 209. A seal member 246 made of a rubber material is arranged on the upper surface of the valve member 214 in order to keep a seal by being come into contact with the normally open valve seat 227. A seal member 247 made of a rubber material is arranged on the lower surface of the valve member 214 in order to keep a seal by being come into contact with the normally close valve seat 229. Since the valve member 214 is integrally formed with the plunger 209, the normally open compression spring 231 used in the first embodiment and the second embodiment is eliminated.

Fourth Embodiment

Figure 12:
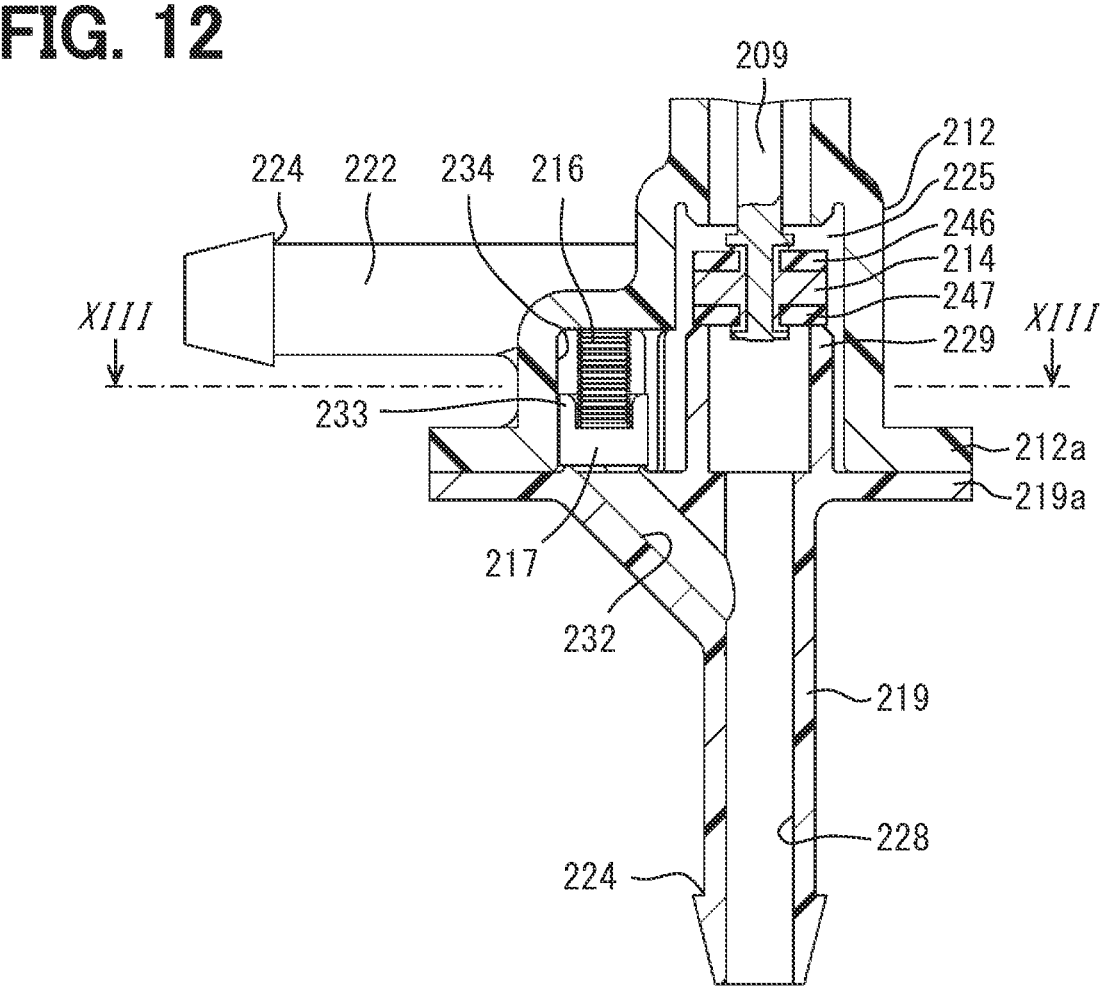
FIG. 12 is a cross-sectional view of an electromagnetic valve of a fourth embodiment.
Figure 13:
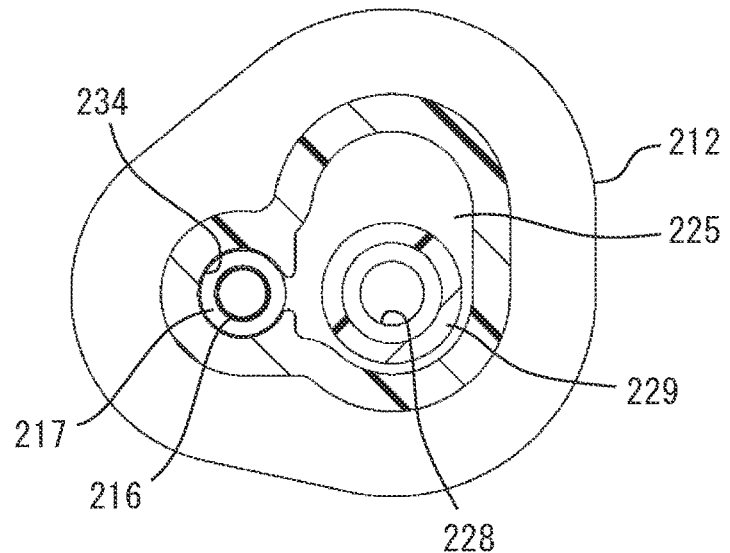
FIG. 13 is a cross-sectional view taken along a line XIII-XIII of FIG. 12.

As shown in FIGS. 12 and 13, in the fourth embodiment, the pressure relief passage 232 is opened in the valve chamber 225. That is, a part of the guide 234 opens and communicates with the valve chamber 225. The valve chamber 225 is formed on a side to the inflow passage 222 than the normally close valve seat 229. Therefore, if the pressure in a side of the normally close outflow passage 228 becomes higher than the relief pressure, the pressure relief valve 233 can be opened to release the pressure to a side to the inflow passage 222.

In the fourth embodiment, the valve member 214 has a disk shape as well as in the third embodiment. However, in the third embodiment, the valve member 214 is integrally formed with the plunger 209, whereas in the fourth embodiment, the valve member 214 is formed into a ring shape and is caulked and fixed to the plunger 209.

Further, in the fourth embodiment, since it is not necessary to open the pressure relief passage 232 in the inflow passage 222, the inflow passage 222 is located on a back side of a paper surface of FIG. 12 than the cross-sectional position illustrated. In addition, the normally open outflow passage 223 is also located in the depth direction of the paper surface of FIG. 12, and the normally open outflow passage 223 is formed to be a shape orthogonal to the inflow passage 222. By doing so, a degree of freedom in a handling of the piping 102 is improved.

Fifth Embodiment

Figure 14:
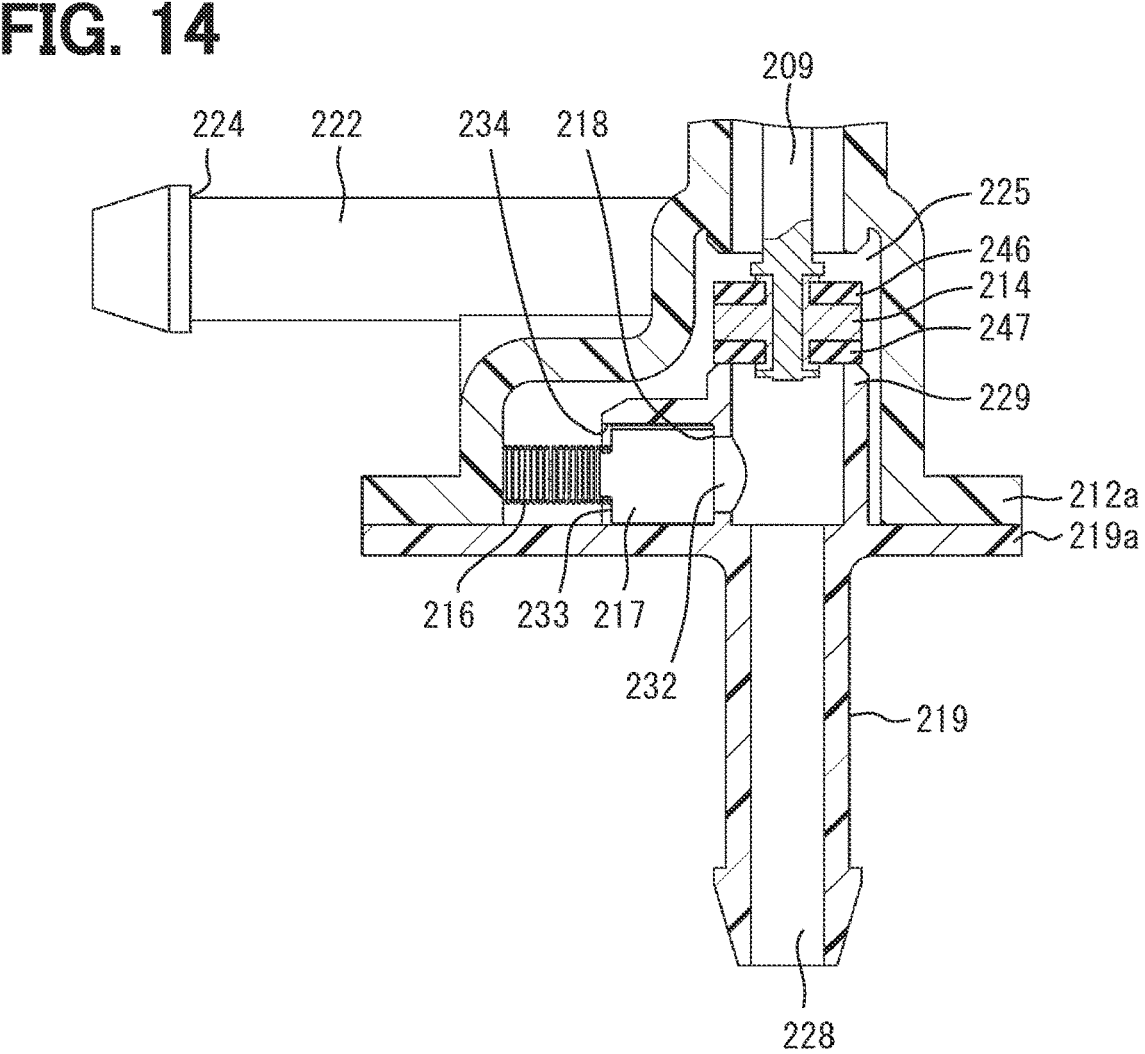
FIG. 14 is a cross-sectional view of an electromagnetic valve of a fifth embodiment.

In the fifth embodiment, as shown in FIG. 14, the guide 234 of the pressure relief valve 233 is formed on the lower body 219. The pressure relief passage 232 is opened in the normally close valve seat 229, and the guide 234 is opened in the valve chamber 225. The pressure relief valve seat 218 is formed around the pressure relief passage 232 of the lower body 219, and the pressure relief valve member 217 and the pressure relief spring 216 are arranged in the horizontal direction.

An operation is the same as that of the fourth embodiment. If a pressure in a side to the normally close outflow passage 228 becomes equal to or higher than a pressure in a side to the inflow passage 222 by the relief pressure, the washer fluid in the normally close outflow passage 228 flows to a side to the passage 222 via the pressure relief passage 232, the guide 234 and the valve chamber 225 and relief the pressure.

Sixth Embodiment

Figure 15:
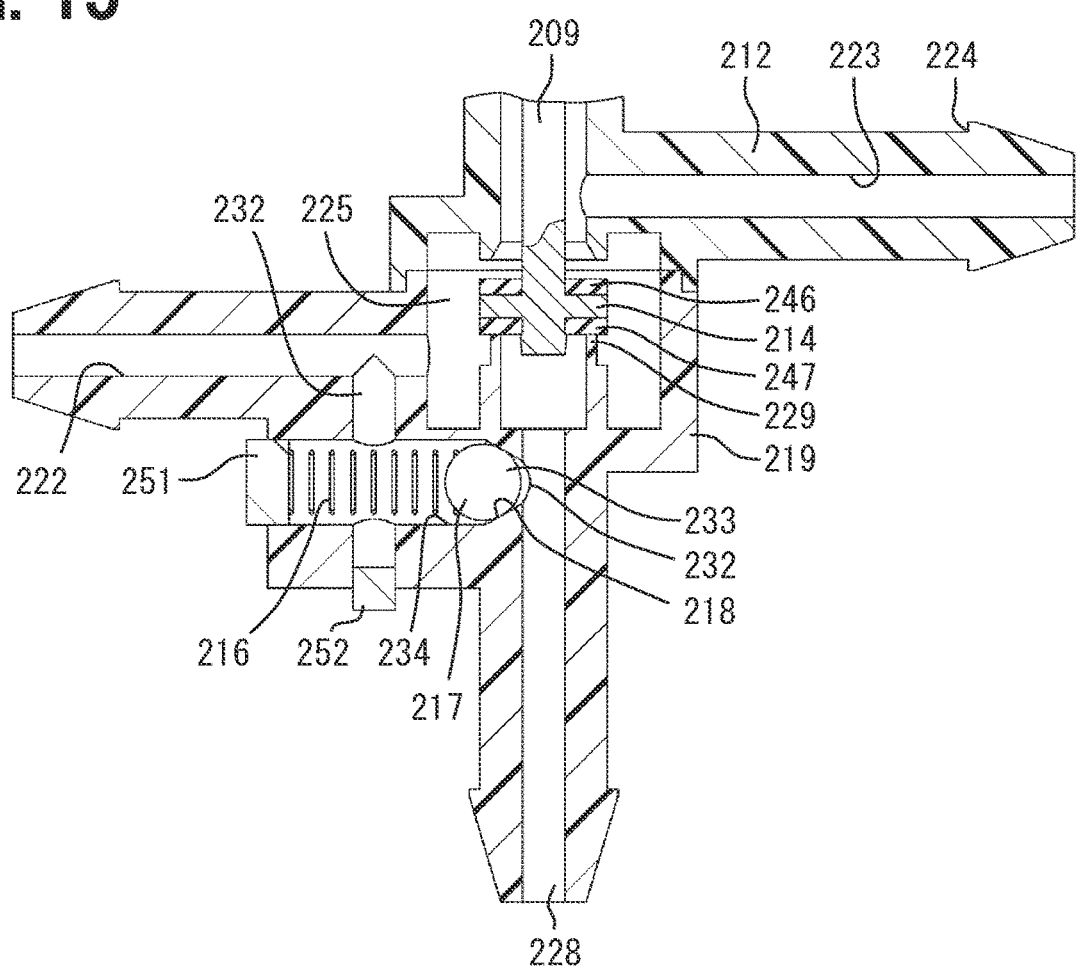
FIG. 15 is a cross-sectional view of an electromagnetic valve of a sixth embodiment.

In the preceding embodiments, the inflow passage 222 is formed in the upper body 212, but in the sixth embodiment, the inflow passage 222 is formed in the lower body 219 as shown in FIG. 15. Therefore, all the pressure relief passages 232 are also formed by the lower body 219. The lower body 219 includes a sealing plug 252 closing the pressure relief passage 232.

In the sixth embodiment, the guide 234 is formed in the horizontal direction, and the pressure relief valve seat 218 is formed around the normally close outflow passage 228 of the lower body 219. After the pressure relief valve member 217 and the pressure relief spring 216 are inserted into the guide 234, the guide 234 is closed by the stopper 251 which also serves as a spring receiver.

In the sixth embodiment, the pressure relief valve member 217 is a spherical shape. Further, the valve member 214 is integrally molded with the plunger 209 as in the third embodiment. In the sixth embodiment, the upper body 212 and the lower body 219 are welded without using a flange.

Seventh Embodiment

Figure 16:
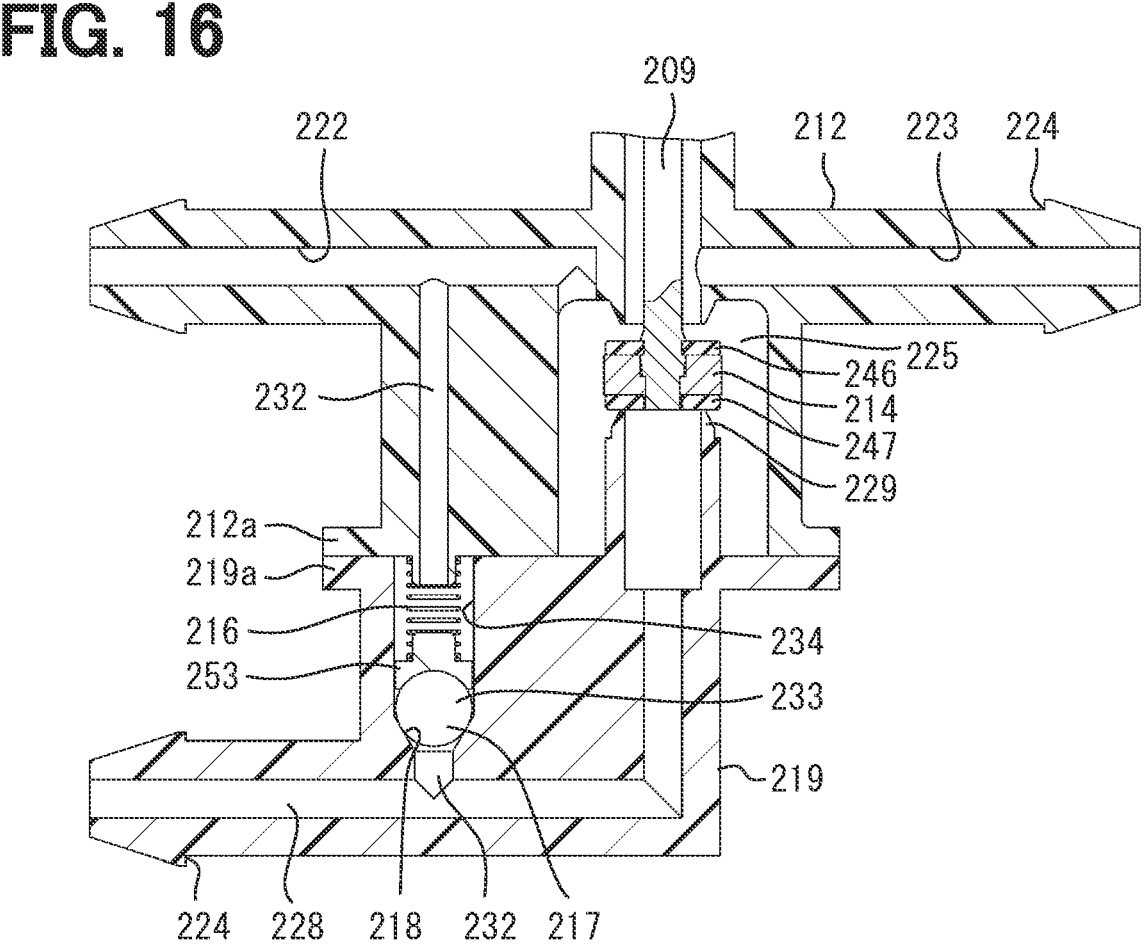
FIG. 16 is a cross-sectional view of an electromagnetic valve of a seventh embodiment.

In the seventh embodiment, as shown in FIG. 16, the pressure relief valve seat 218 and the guide 234 are formed on the lower body 219. The pressure relief valve member 217 is spherical, and an urging force of the pressure relief spring 216 is applied to the pressure relief valve member 217 via the spring receiver 253. Further, the other end of the pressure relief spring 216 is supported by the upper body 212.

Similar to the sixth embodiment, the pressure relief valve 233 is arranged in the lower body 219, but the structure does not use the sealing plug 252 or the stopper 251.

Eighth Embodiment

Figure 17:
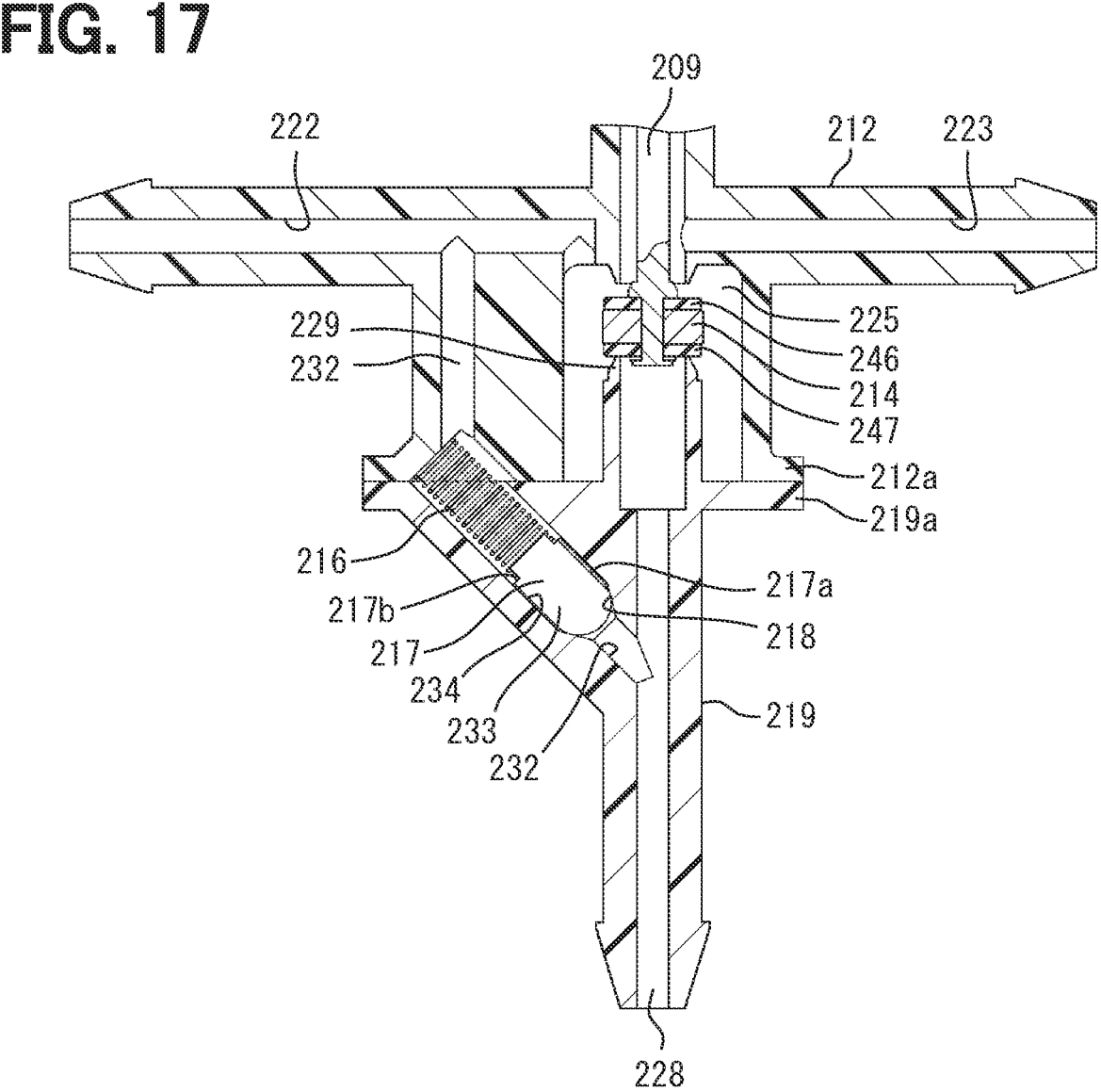
FIG. 17 is a cross-sectional view of an electromagnetic valve of an eighth embodiment.

Also in the eighth embodiment, as shown in FIG. 17, the pressure relief valve seat 218 and the guide 234 are formed on the lower body 219. In the eighth embodiment, the pressure relief valve member 217 has a tubular shape with a rounded tip, and the pressure relief groove 217a is formed on a side surface.

Further, a low protruding portion on a rear end of the pressure relief valve member 217 forms a stepped shape. The stepped shape provides a shoulder portion which serves as a spring receiver 217b for the pressure relief spring 216. The other end of the pressure relief spring 216 is supported by the upper body 212, as in the seventh embodiment.

Ninth Embodiment

Figure 19:
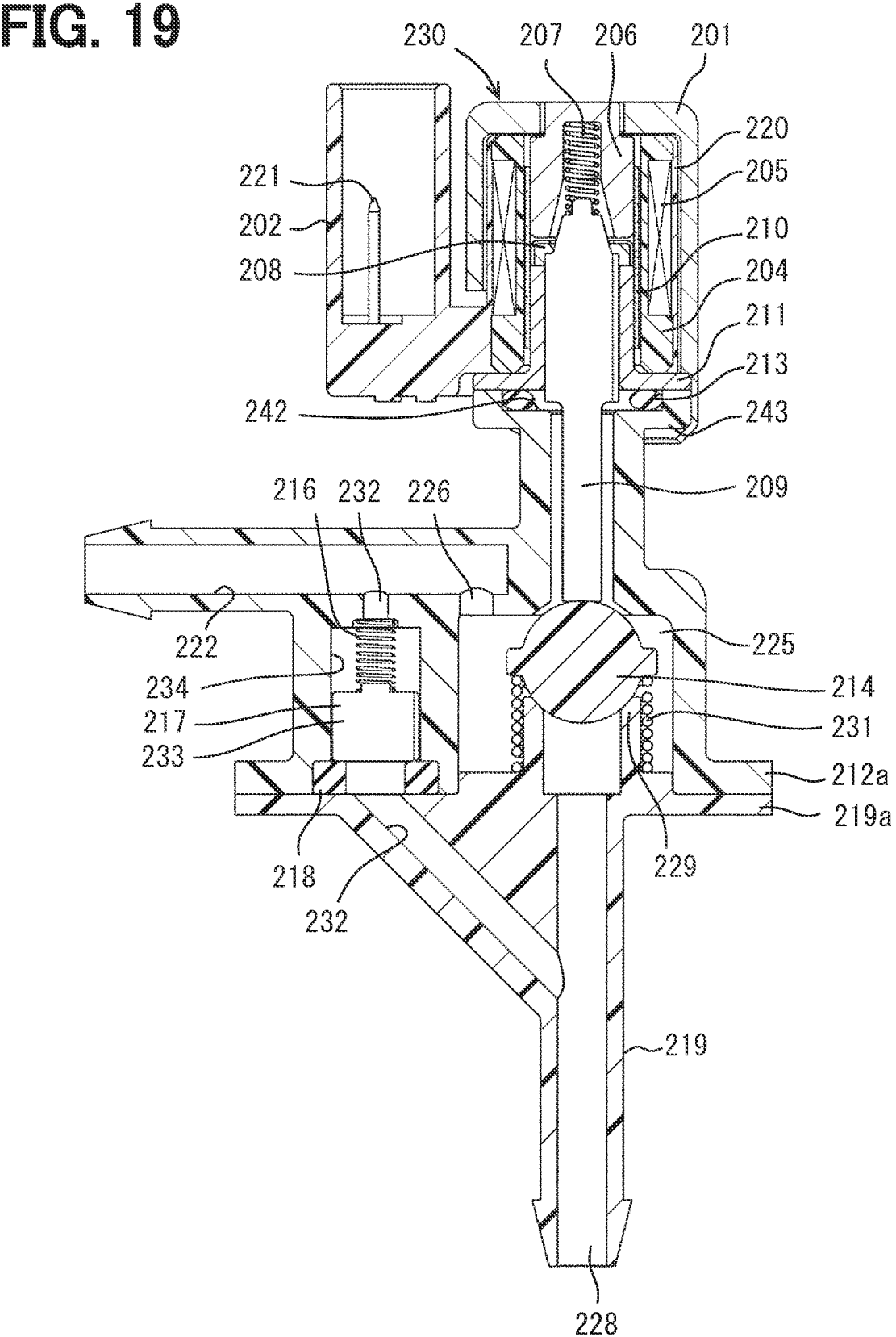
FIG. 19 is a cross-sectional view of an electromagnetic valve of a ninth embodiment.

The preceding embodiments use the three-way valve provided with the normally close outflow passage 228 and the normally open outflow passage 223 as an outflow passage, whereas the ninth embodiment uses an on/off two-way valve in which the outflow passage is only a normally close outflow passage 228. FIG. 19 shows the ninth embodiment, but the structure of the electromagnetic valve 200 is the same as that of the first embodiment except that the normally open outflow passage 223 is eliminated.

Figure 18:
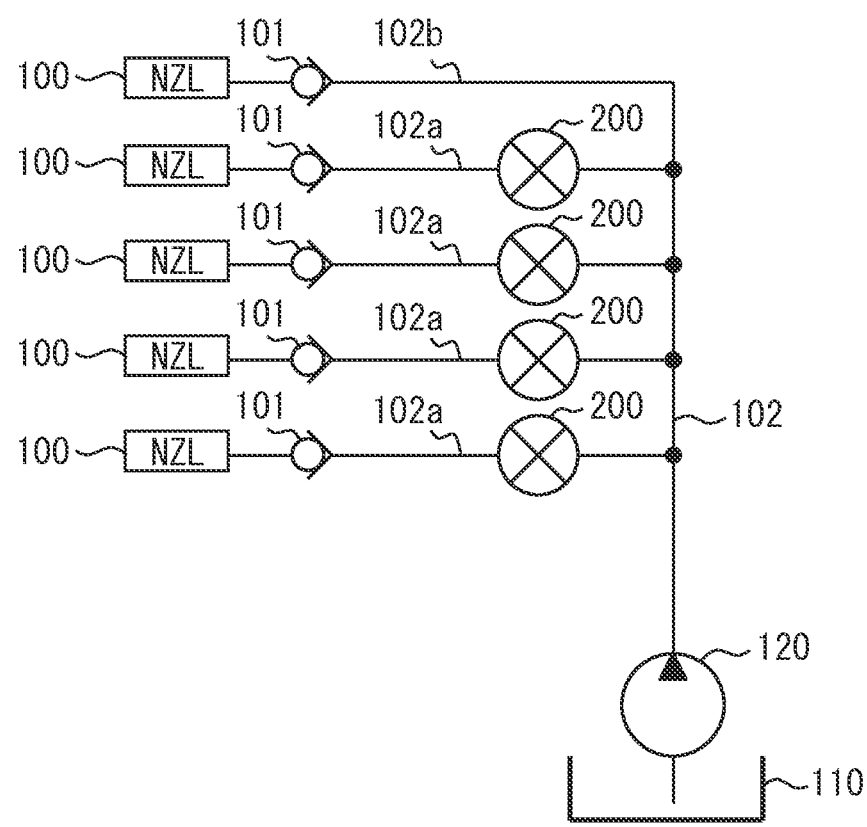
FIG. 18 is a diagram illustrating another piping configuration of an electromagnetic valve.

As shown in FIG. 18, the two-way valve is effective to be used in a fluid system having a plurality of normally close pipes 102a. This is an example in which there are multiple sensors that should be washed with the washer fluid. In FIG. 18, one pipe 102 is used as the normally open pipe 102b so that the washer fluid always flows to the nozzle 100 during the pump 120 is operated. Alternatively, the normally open pipe 102b may be eliminated. Contrary, a plurality of normally open pipes 102b may be used.

Further, in FIG. 18, the number of normally close pipes 102a is four, but the number of the normally close pipes 102a may be increased or decreased depending on an application, and may be one.

Other Embodiments

In the preceding embodiments, the upper body 212 and the lower body 219 are welded, but other fixing methods such as bolt fixing and clip fixing may be used.

Further, the valve body is not limited to a structure composed of two members, the upper body 212 and the lower body 219. It may be composed of three or more members.

Further, although the washer fluid is used as the working fluid, another liquid such as water or oil may be used as the working fluid.

The disclosure in this specification, the drawings, and the like is not limited to the exemplified embodiments. The disclosure encompasses the illustrated embodiments and variations thereof by those skilled in the art.

The embodiments described herein disclose a plurality of technical ideas listed below. Technical Idea 1 provides an electromagnetic valve. The electromagnetic valve, comprising: a coil (205) which is magnetized if energized; a core (206) which is arranged in a magnetic circuit of the coil; a plunger (209) which is arranged in the magnetic circuit of the coil opposed to the core via a magnetic gap; a valve member (214) which is movable with the plunger; a valve body (212, 219) including: an inflow passage of the working fluid; an outflow passage of the working fluid; a normally close valve seat (229) which is formed between the inflow passage and the outflow passage and is come into contact with the valve member; and a pressure relief passage (232) communicating the inflow passage and the outflow passage by bypassing the normally close valve seat; a normally close compression spring (207) which urges the valve member toward a side to the normally close valve seat; and a pressure relief valve (233) which is arranged in the pressure relief passage in the valve body, closes the pressure relief passage, if a pressure of the working fluid in the outflow passage is lower than, is equal to, and is higher by a pressure difference less than a predetermined relief pressure than a pressure of the working fluid in the inflow passage, and opens the pressure relief passage, if the pressure of the working fluid in the outflow passage is higher by a pressure difference equal to or higher than the relief pressure than a pressure of the working fluid in the inflow passage.

A technical idea 2 is the electromagnetic valve according to the technical idea 1, wherein the outflow passage includes two passages, a normally close outflow passage (228) and a normally open outflow passage (223), and wherein the valve body includes: the normally close valve seat (229) formed between the inflow passage and the normally close outflow passage; and a normally open valve seat (227) formed between the inflow passage and the normally open outflow passage. A technical idea 3 is the electromagnetic valve according to the technical idea 1 or the technical idea 2, wherein a passage cross-sectional area of the pressure relief passage is smaller than passage cross-sectional areas of the inflow passage and the outflow passage.

A technical idea 4 is the electromagnetic valve according to any one of the technical ideas 1-3, wherein the pressure relief valve includes: a pressure relief valve seat (218) formed in the pressure relief passage; a pressure relief valve member (217) arranged on a side to the inflow passage of the pressure relief valve seat; and a pressure relief spring (216) urges the pressure relief valve member toward a side to the pressure relief valve seat. A technical idea 5 is the electromagnetic valve according to the technical idea 4, wherein the pressure relief passage is in a circular and tubular shape, and wherein the pressure relief valve member is a columnar shape which slides in the pressure relief passage in the circular and tubular shape, and wherein the pressure relief valve member has a pressure relief groove (217a) formed on a peripheral surface of the columnar shape.

A technical idea 6 is the electromagnetic valve according to any one of the technical ideas 1-3, wherein the pressure relief valve is a duck bill valve having a slit (245) at a tip end, and wherein the duck bill valve closes the slit, if a pressure of the working fluid in the outflow passage is lower than, is equal to, and is higher by a pressure difference less than a predetermined relief pressure than a pressure of the working fluid in the inflow passage, and opens the slit, if the pressure of the working fluid in the outflow passage is higher by a pressure difference equal to or higher than the relief pressure than a pressure of the working fluid in the inflow passage.

A technical idea 7 is a fluid system comprising the electromagnetic valve according to any one of the technical ideas 1-6. The fluid system, comprising: a tank (110) for the working fluid; a pump (120) which sucks the working fluid from the tank and discharges the working fluid in a high pressure; a pipe (102) through which the working fluid from the pump flows; a stop valve (101) which is arranged in the pipe, opens the pipe if the pressure of the working fluid in the pipe is equal to or higher than an open pressure and closes the pipe if the pressure of the working fluid in the pipe is less than the open pressure; and the electromagnetic valve (200). The electromagnetic valve is arranged in the pipe between the pump and the stop valve, and the relief pressure of the pressure relief valve is smaller than the open pressure of the stop valve.

What is claimed is:

1. An electromagnetic valve, comprising:
a coil which is magnetized if energized;
a core which is arranged in a magnetic circuit of the coil;
a plunger which is arranged in the magnetic circuit of the coil opposed to the core via a magnetic gap;
a valve member which is movable with the plunger;

a valve body which includes an inflow passage of working fluid, an outflow passage of the working fluid, a normally close valve seat which is formed between the inflow passage and the outflow passage and contacts valve member, and a pressure relief passage communicating the inflow passage and the outflow passage by bypassing the normally close valve seat;

a normally close compression spring which urges the valve member toward a side to the normally close valve seat; and a pressure relief valve which is arranged in the pressure relief passage in the valve body, closes the pressure relief passage, if a pressure of the working fluid in the outflow passage is lower than, is equal to, and is higher by a pressure difference less than a predetermined relief pressure than a pressure of the working fluid in the inflow passage, and opens the pressure relief passage, if the pressure of the working fluid in the outflow passage is higher by a pressure difference equal to or higher than the relief pressure than a pressure of the working fluid in the inflow passage.

2. The electromagnetic valve claimed in claim 1, wherein the outflow passage includes two passages, a normally close outflow passage and a normally open outflow passage, and wherein the valve body includes:

the normally close valve seat formed between the inflow passage and the normally close outflow passage; and a normally open valve seat formed between the inflow passage and the normally open outflow passage.

3. The electromagnetic valve claimed in claim 1, wherein a passage cross-sectional area of the pressure relief passage is smaller than passage cross-sectional areas of the inflow passage and the outflow passage.

4. The electromagnetic valve claimed in claim 1, wherein the pressure relief valve includes:

a pressure relief valve seat formed in the pressure relief passage;

a pressure relief valve member arranged on a side to the inflow passage of the pressure relief valve seat; and a pressure relief spring urges the pressure relief valve member toward a side to the pressure relief valve seat.

5. The electromagnetic valve claimed in claim 4, wherein the pressure relief passage is in a circular and tubular shape, and wherein the pressure relief valve member is a columnar shape which slides in the pressure relief passage in the circular and tubular shape, and wherein the pressure relief valve member has a pressure relief groove formed on a peripheral surface of the columnar shape.

6. The electromagnetic valve claimed in claim 1, wherein the pressure relief valve is a duck bill valve having a slit at a tip end, and wherein the duck bill valve closes the slit, if a pressure of the working fluid in the outflow passage is lower than, is equal to, and is higher by a pressure difference less than a predetermined relief pressure than a pressure of the working fluid in the inflow passage, and opens the slit, if the pressure of the working fluid in the outflow passage is higher by a pressure difference equal to or higher than the relief pressure than a pressure of the working fluid in the inflow passage.

7. A fluid system, comprising:

a tank for working fluid;

a pump which sucks the working fluid from the tank and discharges the working fluid in a high pressure;

a pipe through which the working fluid from the pump flows;

a stop valve which is arranged in the pipe, opens the pipe if the pressure of the working fluid in the pipe is equal to or higher than an open pressure and closes the pipe if the pressure of the working fluid in the pipe is less than the open pressure; and an electromagnetic valve, wherein the electromagnetic valve including:

a coil which is magnetized if energized;

a core which is arranged in a magnetic circuit of the coil:

a plunger which is arranged in the magnetic circuit of the coil opposed to the core via a magnetic gap;

a valve member which is movable with the plunger;

a valve body which includes an inflow passage of the working fluid, an outflow passage of the working fluid, a normally close valve seat which is formed between the inflow passage and the outflow passage and contacts the valve member, and a pressure relief passage communicating the inflow passage and the outflow passage by bypassing the normally close valve seat;

a normally close compression spring which urges the valve member toward a side to the normally close valve seat; and a pressure relief valve which is arranged in the pressure relief passage in the valve body, closes the pressure relief passage, if a pressure of the working fluid in the outflow passage is lower than, is equal to, and is higher by a pressure difference less than a predetermined relief pressure than a pressure of the working fluid in the inflow passage, and opens the pressure relief passage, if the pressure of the working fluid in the outflow passage is higher by a pressure difference equal to or higher than the relief pressure than a pressure of the working fluid in the inflow passage, and wherein the electromagnetic valve is arranged in the pipe between the pump and the stop valve, and wherein the relief pressure of the pressure relief valve is smaller than the open pressure of the stop valve.

* * * * *